US011034446B2

(12) United States Patent
Tang et al.

(10) Patent No.: US 11,034,446 B2
(45) Date of Patent: Jun. 15, 2021

(54) POWER SUPPLY ASSEMBLY

(71) Applicant: SZ DJI TECHNOLOGY CO., LTD., Shenzhen (CN)

(72) Inventors: Yin Tang, Shenzhen (CN); Jiangang Feng, Shenzhen (CN); Guisheng Nong, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 485 days.

(21) Appl. No.: 16/110,756

(22) Filed: Aug. 23, 2018

(65) Prior Publication Data

US 2018/0362159 A1 Dec. 20, 2018

Related U.S. Application Data

(63) Continuation of application No. PCT/CN2016/074915, filed on Feb. 29, 2016.

(51) Int. Cl.
*B64C 39/02* (2006.01)
*B64D 27/24* (2006.01)
*B64D 47/08* (2006.01)

(52) U.S. Cl.
CPC ............ *B64C 39/024* (2013.01); *B64D 27/24* (2013.01); *B64D 47/08* (2013.01); *B64C 2201/024* (2013.01); *B64C 2201/027* (2013.01); *B64C 2201/042* (2013.01); *B64C 2201/127* (2013.01); *B64C 2201/18* (2013.01)

(58) Field of Classification Search
CPC ............ B64C 39/024; B64C 2201/042; B64C 2201/024
USPC .......................................................... 244/57
See application file for complete search history.

(56) References Cited

U.S. PATENT DOCUMENTS

| 8,235,324 | B1 | 8/2012 | Birch et al. | |
|---|---|---|---|---|
| 9,945,828 | B1* | 4/2018 | Poling | G06T 7/0004 |
| 9,981,743 | B2* | 5/2018 | Thelen | B64C 39/024 |
| 10,850,838 | B2* | 12/2020 | Castleman | B64C 39/024 |
| 2011/0301784 | A1* | 12/2011 | Oakley | G05D 1/0858 |
| | | | | 701/2 |
| 2014/0299708 | A1* | 10/2014 | Green | B64D 27/24 |
| | | | | 244/17.23 |
| 2014/0332620 | A1* | 11/2014 | Earon | B64D 47/08 |
| | | | | 244/13 |

(Continued)

FOREIGN PATENT DOCUMENTS

| CN | 203047531 U | 7/2013 |
|---|---|---|
| CN | 103325979 A | 9/2013 |

(Continued)

OTHER PUBLICATIONS

The World Intellectual Property Organization (WIPO) International Search Report for PCT/CN2016/074915 dated Nov. 30, 2016 8 pages.

*Primary Examiner* — Christopher P Ellis
(74) *Attorney, Agent, or Firm* — Anova Law Group, PLLC

(57) ABSTRACT

An unmanned aerial vehicle includes a fuselage and a power supply assembly arranged at the fuselage. The power supply assembly includes a polyhedron mounting bracket arranged at the fuselage, a power supply device arranged at the fuselage, and at least two functional circuits arranged separately on different outer surfaces of the mounting bracket and electrically coupled to each other and to the power supply device.

20 Claims, 3 Drawing Sheets

(56) References Cited

U.S. PATENT DOCUMENTS

| | | | |
|---|---|---|---|
| 2015/0344136 A1* | 12/2015 | Dahlstrom | B64C 39/024 701/3 |
| 2016/0144954 A1* | 5/2016 | Daigle | B64C 39/024 244/17.23 |
| 2017/0043870 A1* | 2/2017 | Wu | B64D 47/08 |
| 2017/0129352 A1* | 5/2017 | Lin | B25J 9/00 |
| 2017/0225796 A1* | 8/2017 | Sun | B64D 33/08 |
| 2017/0297738 A1* | 10/2017 | von Flotow | B64C 27/32 |
| 2017/0305537 A1* | 10/2017 | Smith | B64C 39/024 |
| 2017/0327224 A1* | 11/2017 | Phan | G08G 5/0056 |
| 2018/0086472 A1* | 3/2018 | Gore | H01M 50/502 |
| 2018/0118322 A1* | 5/2018 | Harris | B64C 39/024 |
| 2018/0354625 A1* | 12/2018 | Verkade | B64C 39/024 |
| 2019/0039743 A1* | 2/2019 | Tanriover | E05B 77/54 |
| 2019/0061970 A1* | 2/2019 | Wang | H02N 11/002 |
| 2019/0135403 A1* | 5/2019 | Perry | B64C 1/068 |
| 2019/0144115 A1* | 5/2019 | Chen | B64C 25/32 244/118.1 |
| 2019/0248502 A1* | 8/2019 | Tang | B64D 27/26 |
| 2019/0259998 A1* | 8/2019 | Yang | H01M 50/20 |
| 2019/0375510 A1* | 12/2019 | Qiu | B64D 27/24 |
| 2020/0164957 A1* | 5/2020 | Xu | B64C 39/024 |
| 2020/0225684 A1* | 7/2020 | Anderson | G05D 1/0022 |
| 2020/0346747 A1* | 11/2020 | Lukaczyk | B64C 7/00 |
| 2020/0346777 A1* | 11/2020 | Tong | B64C 39/024 |

FOREIGN PATENT DOCUMENTS

| | | | |
|---|---|---|---|
| CN | 203740115 U | 7/2014 | |
| CN | 204121762 U | 1/2015 | |
| CN | 204144349 U | 2/2015 | |
| CN | 204297110 U | 4/2015 | |
| CN | 204568055 U | 8/2015 | |
| CN | 204688429 U | 10/2015 | |
| CN | 105035312 A | 11/2015 | |
| CN | 204937492 U | 1/2016 | |
| CN | 205022853 U | 2/2016 | |
| CN | 205469856 U | 8/2016 | |
| EP | 3168149 A1 * | 5/2017 | B64C 27/08 |

* cited by examiner

POWER SUPPLY ASSEMBLY

CROSS-REFERENCE TO RELATED APPLICATION

This application is a continuation application of International Application No. PCT/CN2016/074915, filed on Feb. 29, 2016, the entire contents of which are incorporated herein by reference.

TECHNICAL FIELD

The present disclosure relates to a power supply assembly, an unmanned aerial vehicle (UAV), and a remote control mobile apparatus thereof.

BACKGROUND

A remote control mobile apparatus, such as a UAV, a self-driving car, or the like, includes a main structural frame, also referred to as body-on-frame, and a control device, a power supply device, and a kinetic power device provided on the main structural frame. The user utilizes a controller, e.g., a remote controller, to remotely control the control device, such that the control device controls the kinetic power device to impel the remote control mobile apparatus to move as a whole. The power supply device is configured to provide electronic energy for the kinetic power device. Because of the miniaturization requirement of the remote control mobile apparatus, the main structural frame is configured to integrate as many functional circuits as possible in a circuit board and to arrange the circuit board inside the housing of the remote control mobile apparatus. However, since all the functional circuits are integrated in the circuit board, it is inconvenient to assemble, disassemble, or repair the main structural frame.

SUMMARY

In accordance with the disclosure, there is provided an unmanned aerial vehicle (UAV) includes a fuselage and a power supply assembly arranged at the fuselage. The power supply assembly includes a polyhedron mounting bracket arranged at the fuselage, a power supply device arranged at the fuselage, and at least two functional circuits arranged separately on different outer surfaces of the mounting bracket and electrically coupled to each other and to the power supply device.

DESCRIPTION OF MAIN COMPONENTS AND LABELS

| UAV | 1 |
| --- | --- |
| fuselage | 100 |
| upper housing assembly | 20 |
| upper housing | 21 |
| mounting bracket | 23 |
| first mounting member | 231 |
| second mounting member | 233 |
| third mounting member | 235 |
| fourth mounting member | 237 |
| receiving space | 239 |
| power supply device | 25 |
| functional circuit | 27 |
| first circuit board | 271 |
| second circuit board | 273 |
| third circuit board | 275 |
| controller | 28 |
| adapter | 29 |
| interface | 291 |
| lower housing assembly | 40 |
| lower housing | 41 |
| first housing member | 411 |
| mounting hatch | 4111 |
| second housing member | 413 |
| receiving cavity | 42 |
| controlling device | 43 |
| first controlling device | 431 |
| second controlling device | 433 |
| heat radiator | 45 |
| landing stands | 60 |
| kinetic power device | 300 |
| motor | 310 |
| gimbal camera | 400 |
| gimbal | 410 |
| image acquisition device | 430 |

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

In the situation where the technical solutions described in the present disclosure are not conflicting, they can be combined.

Figure 1:
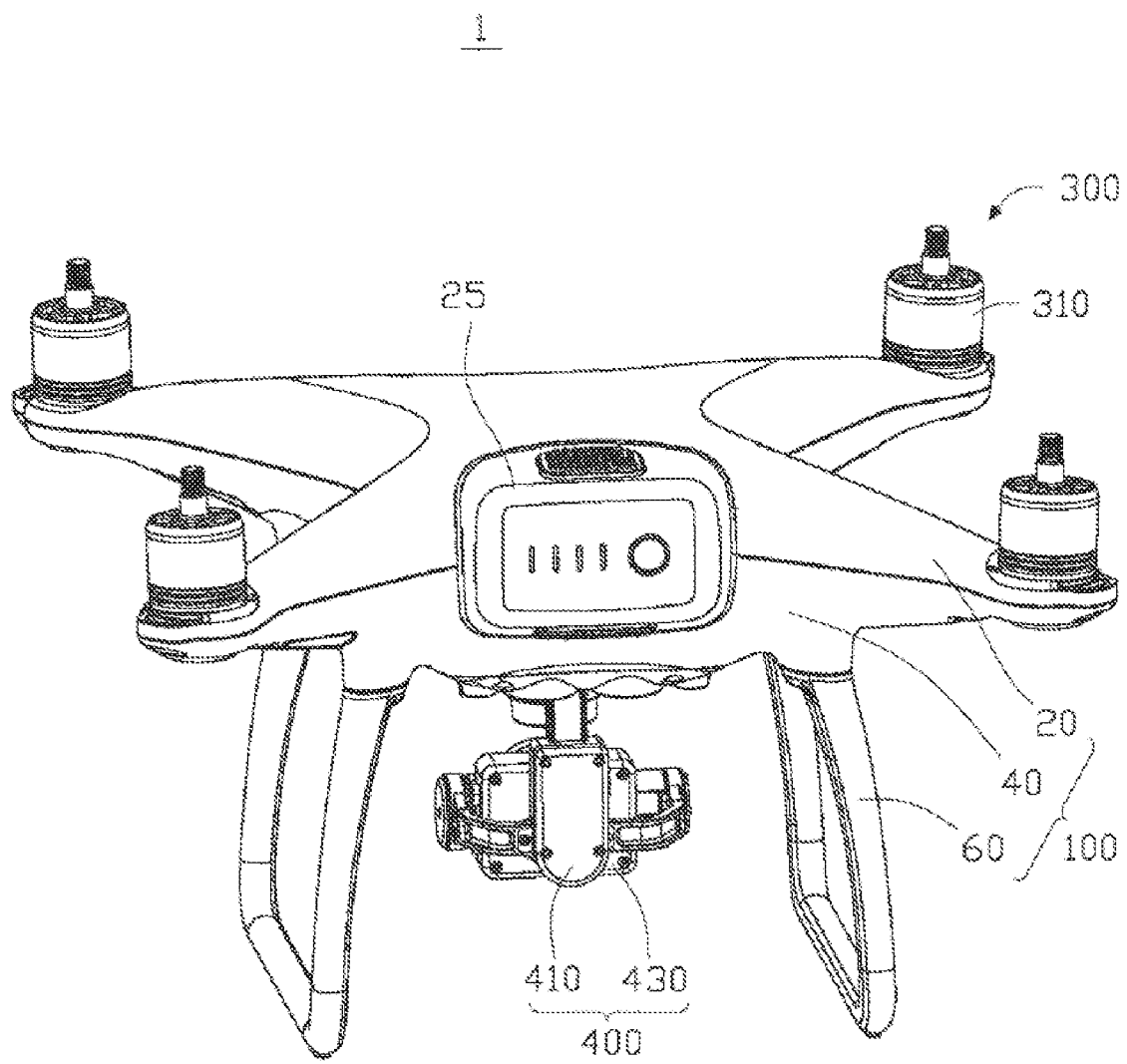
FIG. 1 is a perspective view of an unmanned aerial vehicle (UVA) according to various exemplary embodiments of the disclosure.

A remote control mobile apparatus consistent with the disclosure includes, but is not limited to, an unmanned aerial vehicle (UAV), a self-driving car, a driverless boat, or the like. FIG. 1 shows a UAV 1 as an example of the remote control mobile apparatus consistent with the disclosure. As shown in FIG. 1, the UAV 1 includes a fuselage 100 and a kinetic power device 300 provided on the fuselage 100. The kinetic power device 300 is configured to provide kinetic power for the UAV 1. The UAV 1 is configured to carry a gimbal camera 400 for aerial photography. The gimbal camera 400 includes a gimbal 410 and an image acquisition device 430 provided on the gimbal 410.

The fuselage 100 includes an upper housing assembly 20, a lower housing assembly 40, and landing stands 60. As shown in FIG. 1, the upper housing assembly 20 and the lower housing assembly 40 are interlocked with each other to form a housing of the UAV 1. The landing stands 60 are provided on the lower housing assembly 40 and are configured to support the UAV 1 when the UAV 1 is landed.

Figure 3:
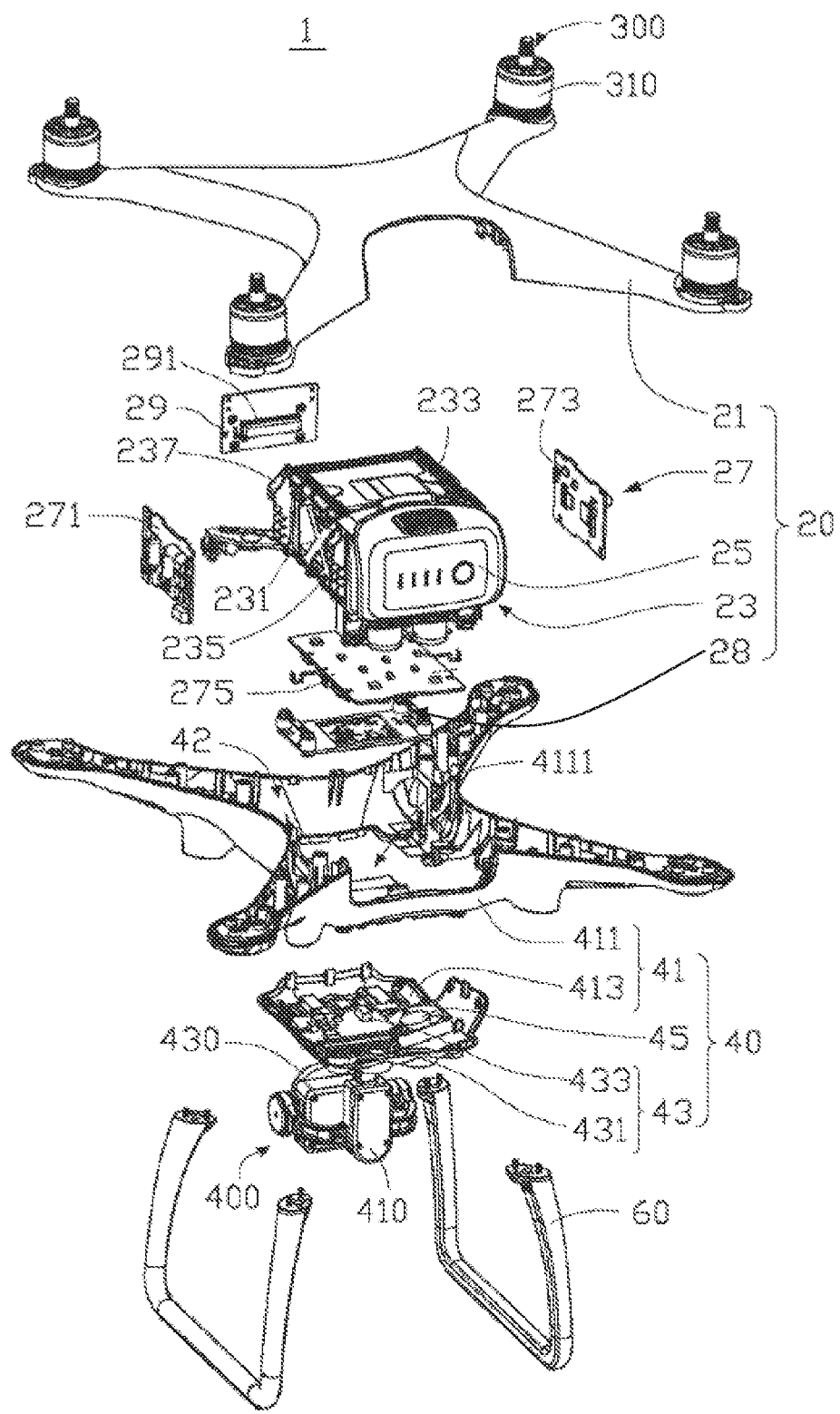
FIG. 3 is an exploded view of the UAV in FIG. 1.

FIG. 3 is an exploded view of the UAV 1. As shown in FIG. 3, the lower housing assembly 40 includes a lower housing 41, one or more controlling devices 43, and a heat radiator 45. The one or more controlling devices 43 and the heat radiator 45 are provided on the lower housing 41 and are arranged between the lower housing 41 and the upper housing assembly 20.

The lower housing 41 has a concave-like shape in which a receiving cavity 42 is formed. The lower housing 41 and the upper housing assembly 20 complement each other to accommodate some components of the UAV 1. As shown in FIG. 3, the lower housing 41 includes a first housing member 411 and a second housing member 413 connected with the first housing member 411. A mounting hatch 4111 is provided approximately in the middle of the first housing member 411 and communicates with the receiving cavity 42. The second housing member 413 is provided at the mounting hatch 4111 and is configured to close the mounting hatch 4111. By disassembling or assembling the second housing member 413, the mounting hatch 4111 can be opened or closed to enable a user to check or maintain the components inside the fuselage 100.

As shown in FIG. 3, the second housing member 413 is also configured to mount the gimbal camera 400. In some embodiments, the gimbal 410 of the gimbal camera 400 is provided on a side of the second housing member 413 facing away from the receiving cavity 42, i.e., an outer side of the second housing member 413, and the image acquisition device 430 is provided on the gimbal 410. In some embodiments, the gimbal 410 may be omitted and the image acquisition device 430 may be directly connected to the second housing member 413.

The one or more controlling devices 43 are provided on another side of the second housing member 413 facing towards the receiving cavity 42, i.e., an inner side of the second housing member 413. The one or more controlling devices 43 are electrically coupled to the gimbal camera 400 and are configured to control the movement of the gimbal camera 400 for adjusting the image acquisition device 430 to a desired shot angle. In the example shown in FIG. 3, two controlling devices 43 are provided, i.e., a first controlling device 431 and a second controlling device 433, each including a control circuit board. The first controlling device 431 is fixedly stacked on the second housing member 413 and the second controlling device 433 is stacked on the first controlling device 431.

In some other embodiments, the one or more controlling devices 43 may include one, three, four, or more control circuit boards. The one or more controlling devices 43 may be directly mounted on the second housing member 413 of the lower housing 41 without additional mounting bracket dedicated to the one or more controlling devices 43. As such, the interior structure of the fuselage 100 can be simplified, the remaining space can be relatively larger, and the overall weight of the fuselage 100 can be relatively lighter.

The heat radiator 45 is provided at a side of the one or more controlling devices 43 and is fixed to the second housing member 413. In some embodiments, the heat radiator 45 may be a cooling fan for promoting air circulation inside the housing of the UAV 1 to prevent the UAV 1 from overheating during operation.

Figure 2:
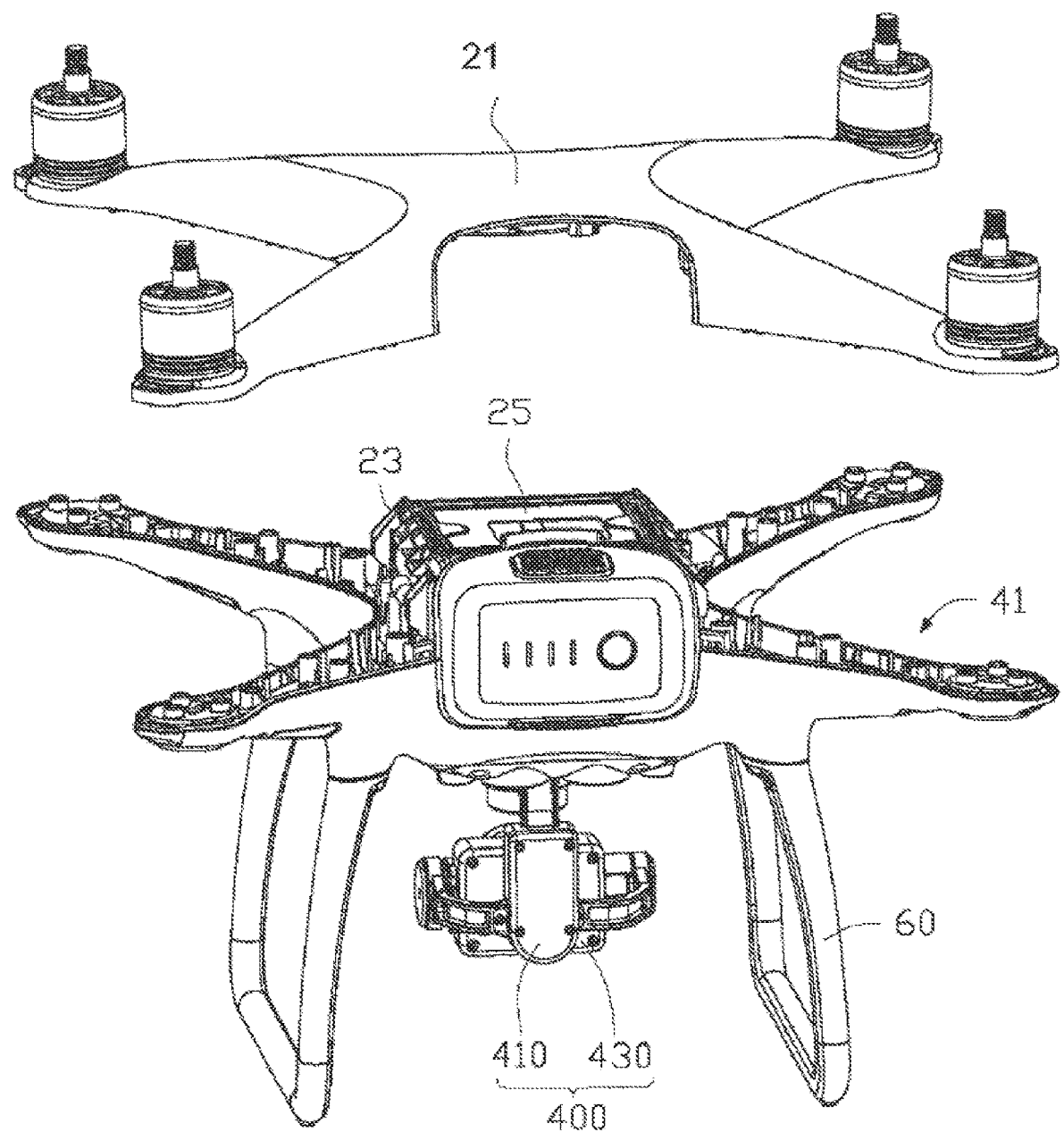
FIG. 2 is a partially exploded view of the UAV in FIG. 1.

The landing stands 60 are provided on the first housing member 411 and are arranged on a side of the first housing member 411 facing away from the receiving cavity 42, i.e., an outer side of the first housing member 411. As shown in FIGS. 1 to 3, the UAV 1 includes two landing stands 60 spaced apart from each other. In some embodiments, the landing stands 60 may be fixed landing stands. In some other embodiments, the landing stands 60 may be retractable landing stands.

The upper housing assembly 20 is provided on the first housing member 411 and is arranged on another side of the first housing member 411 facing away from the landing stands 60, i.e., an inner side of the first housing member 411. The upper housing assembly 20 includes an upper housing 21, a mounting bracket 23, a power supply device 25, functional circuits 27, and a controller 28. As shown in FIG. 3, the mounting bracket 23 is provided between the upper housing 21 and the first housing member 411. The power supply device 25, the functional circuits 27, and the controller 28 are arranged in the mounting bracket 23.

The upper housing 21 has a concave-like shape and covers the lower housing 41. The upper housing 21 and the lower housing 41 complement each other to accommodate some components of the UAV 1.

The mounting bracket 23 is provided between the upper housing 21 and the lower housing 41 and is connected to the upper housing 21. The mounting bracket 23 is arranged at a position corresponding to the position of the controlling device 43. The mounting bracket 23 is configured to accommodate the power supply device 25 and the functional circuits 27. In the example shown in FIG. 3, the mounting bracket 23 includes a polyhedron mounting bracket. In some embodiments, the mounting bracket 23 includes a rectangle-shaped frame with a hollow structure.

The mounting bracket 23 is provided with a plurality of mounting members. The plurality of mounting members include, but are not limited to, a first mounting member 231, a second mounting member 233, a third mounting member 235, and a fourth mounting member 237. In the example shown in FIG. 3, the first mounting member 231 and the second mounting member 233 are spaced apart from each other and are approximately parallel to each other. The third mounting member 235 is provided at a side of the first mounting member 231 and a side of the second mounting member 233 that are close to the lower housing 41, and two opposite side edges of the third mounting member 235 are connected to the first mounting member 231 and the second mounting member 233, respectively. The fourth mounting member 237 is provided at a side of the third mounting member 235 that is close to the upper housing 21, i.e., an upper side of the third mounting member 235, and three side edges of the fourth mounting member 237 are connected to the first mounting member 231, the second mounting member 233, and the third mounting member 235, respectively.

The first mounting member 231, the second mounting member 233, the third mounting member 235, and the fourth mounting member 237 are connected as described above to make the mounting bracket 23 a drawer-shaped structure and form a receiving space (not labeled) for accommodating the power supply device 25.

In some embodiments, the power supply device 25 includes a battery pack and is provided inside the receiving space of the mounting bracket 23.

In some embodiments, a plurality of functional circuits 27 are arranged separately on different outer surfaces of the mounting bracket 23. The plurality of functional circuits 27 are electrically coupled to the power supply device 25 and among each other. In the example shown in FIG. 3, the plurality of functional circuits 27 include three circuit boards, which are referred to as a first circuit board 271, a second circuit board 273, and a third circuit board 275, respectively. The first circuit board 271, the second circuit board 273, and the third circuit board 275 are mounted on the first mounting member 231, the second mounting member 233, and the third mounting member 235, respectively. As shown in FIG. 3, the first circuit board 271 and the second circuit board 273 are stacked on the outer surfaces of opposite sides of the mounting bracket 23, respectively. The third circuit board 275 is provided on the outer surface of another side of the mounting bracket 23 that is different from the sides of the mounting bracket 23, on which the first circuit board 271 and the second circuit board 273 are stacked. Two opposite side edges of the third circuit board 275 are adjacent to and apart from the first circuit board 271 and the second circuit board 273, respectively.

Furthermore, the plurality of functional circuits 27 are configured to implement different functions. In some other embodiments, the plurality of functional circuits 27 may include two, three, five, seven, or more circuit boards. The plurality of functional circuits 27 may also be a combination of any two or more of: a speed sensing circuit, a gravity sensing circuit, a visual sensing circuit, a magnetic field sensing circuit, and a control circuit.

The controller 28 is provided on a side of the third circuit board 275 facing away from the mounting bracket 23 and is fixed to the mounting bracket 23. In the example shown in FIG. 3, the length of the controller 28 is longer than the length of the third circuit board 275. Both ends of the controller 28 extend relative to the corresponding ends of the third circuit board 275 and are electrically coupled to the power supply device 25. In some embodiments, the controller 28 includes a flight controller for controlling the UAV 1 to perform a flight task.

The upper housing assembly 20 further includes an adapter 29, which is provided on a side of the mounting bracket 23. The adapter 29 is electrically coupled to the power supply device 25. In some embodiments, the adapter 29 is stacked on the fourth mounting member 237 and is arranged on the outer side of the mounting bracket 23. The adapter 29 is provided with an interface 291, which is electrically coupled to the power supply device 25. In some embodiments, the interface 291 includes a standard data interface for transmitting electronic power and/or data. Two opposite side edges of the adapter 29 are adjacent to the first circuit board 271 and the second circuit board 273, respectively.

The kinetic power device 300 is provided on the fuselage 100. In some embodiments, the kinetic power device 300 may include a plurality of rotor assemblies. In the example shown in FIG. 3, the UAV 1 is a four-rotor aircraft, i.e., an aircraft with four rotor assemblies. The kinetic power device 300 includes motors 310 and propellers (not shown) connected to the motors 310, respectively. The motors 310 can drive the propellers to rotate, which provides the kinetic power for the UAV 1 to flight. In some other embodiments, the UAV 1 may be a six-rotor aircraft, an eight-rotor aircraft, a twelve-rotor aircraft, or the like. In some other embodiments, the UAV 1 may be a single-rotor aircraft. In some other embodiments, the UAV 1 may be a fixed-wing aircraft or a rotor-fixed wing hybrid aircraft.

According to the disclosure, the mounting bracket 23, the power supply device 25, and the functional circuits 27 can constitute the power supply assembly of the UAV 1. In the power supply assembly, the mounting bracket 23 is a polyhedron-shaped mounting bracket, and the plurality of functional circuits 27 are provided separately on different sides of the mounting bracket 23, such that the plurality of functional circuits 27 can be installed and debugged, respectively, thereby facilitating the installation, debugging, and disassembling of the power supply assembly. The plurality of functional circuits 27 are arranged separately to properly utilize the inner cavity space of the fuselage 100. As such, the structure of the power supply assembly is relatively more compact, which leaves more free space for the inner cavity of the fuselage 100, thereby providing an effective airflow-channel and facilitating the heat dissipation of the UAV 1.

Furthermore, the power supply assembly is detachably mounted on the upper housing 21 to constitute the upper housing assembly 20, and the controlling device 43 and the heat radiator 45 are mounted on the lower housing 41 to constitute the lower housing assembly 40. As such, the structure of the UAV 1 is more compact, which facilitates assembling, disassembling, and debugging of the components of the UAV 1.

Therefore, the controller, the power supply device, and the plurality of functional circuits of the UAV 1 are configured as separate parts and are arranged separately on the mounting bracket. As such, the layout of the power supply assembly may be more proper, and the overall volume of the UAV 1 may be reduced. The assembling, disassembling, or maintenance of the power supply assembly in the UAV 1 may be facilitated.

In some other embodiments, the structure of the mounting bracket 23 is not limited to the rectangle-shaped frame structure described above, but may also be another polyhedron-shaped structure. For example, the mounting bracket 23 may be a tetrahedron-shaped mounting structure, a hexahedron-shaped mounting structure, an octahedron-shaped mounting structure, or the like. The plurality of functional circuits 27 may be provided separately on different sides of the mounting bracket 23.

In some other embodiments, the UAV 1 may be used in fields other than aerial photography, such as ground mapping, disaster inspection, pesticides spraying, or the like. Accordingly, the UAV 1 may carry a load other than the gimbal camera 400, such as a detector, spray equipment, or the like.

In some other embodiments, the remote control mobile apparatus may be a mobile apparatus other than a UAV. For example, the remote control mobile apparatus may be a self-driving car, of which the controller 28 may be a travel controller, the power supply device 25 may be a battery pack or a fuel assembly, and the kinetic power device 300 may be wheel assemblies. In some other embodiments, the remote control mobile apparatus may be a driverless boat, an unmanned submarine, or the like.

The terms "first," "second," or the like in the specification, claims, and the drawings of the present disclosure are merely used to distinguish similar elements, and are not intended to describe a specified order or a sequence. In addition, the terms "including," "comprising," and variations thereof herein are open, non-limiting terminologies, which are meant to encompass a series of steps of processes and methods, or a series of units of systems, apparatuses, or devices listed thereafter and equivalents thereof as well as additional steps of the processes and methods or units of the systems, apparatuses, or devices.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An unmanned aerial vehicle (UAV) comprising:
a fuselage; and
a power supply assembly arranged at the fuselage and including:
  a polyhedron mounting bracket arranged at the fuselage;
  a power supply device arranged at the fuselage; and
  at least two functional circuits arranged separately on different outer surfaces of the mounting bracket and electrically coupled to each other and to the power supply device.

2. The UAV of claim 1, wherein:
the fuselage includes a housing; and
the power supply assembly is arranged inside the housing.

3. The UAV of claim 1, wherein:
the fuselage includes an upper housing and a lower housing interlocked with each other; and
the power supply assembly is arranged between the upper housing and the lower housing.

4. The UAV of claim 3, further comprising:
one or more controlling devices arranged at the lower housing and corresponding to the mounting bracket.

5. The UAV of claim 4, wherein:
the one or more controlling devices include a first controlling device fixedly stacked on the lower housing and the first controlling device includes a circuit board.

6. The UAV of claim 5, wherein:
the one or more controlling devices further include a second controlling device stacked on the first controlling device and the second controlling device includes a circuit board.

7. The UAV of claim 4, further comprising:
a heat radiator provided at the lower housing and adjacent to the one or more controlling devices.

8. The UAV of claim 7, wherein:
the one or more controlling devices and the heat radiator are separately fixed on the lower housing to form a lower housing assembly with the lower housing; or
the lower housing includes:
  a first housing member interlocked with the upper housing; and
  a second housing member detachably coupled to the first housing member.

9. The UAV of claim 7, wherein:
the one or more controlling devices and the heat radiator are separately fixed on the second housing member.

10. The UAV of claim 3, wherein the lower housing includes:
a first housing member interlocked with the upper housing; and
a second housing member detachably coupled to the first housing member.

11. The UAV of claim 10, wherein:
the first housing member includes a mounting hatch extending through the first housing member and communicating with a receiving cavity of the fuselage, and the second housing member is arranged at the mounting hatch; or
the UAV carries an image acquisition device that is connected to the second housing member of the fuselage; or
a landing stand arranged at the first housing member and extending away from the fuselage.

12. The UAV of claim 1, wherein the at least two functional circuits are configured to perform different functions.

13. The UAV of claim 12, wherein each of the at least two functional circuits includes at least one of a speed sensing circuit, a gravity sensing circuit, a visual sensing circuit, a magnetic field sensing circuit, or a control circuit.

14. The UAV of claim 12, wherein the at least two functional circuits include a first circuit board and a second circuit board separately arranged on opposite sides of the mounting bracket.

15. The UAV of claim 14, wherein:
the power supply device is arranged inside the mounting bracket; and
the first circuit board and the second circuit board are stacked on outer surfaces of the opposite sides of the mounting bracket, respectively.

16. The UAV of claim 15, wherein:
the power supply device further includes an adapter arranged at an end of the mounting bracket and electrically coupled to the power supply device.

17. The UAV of claim 16, wherein:
the adapter is stacked on an outer side of the mounting bracket, and two opposite side edges of the adapter are adjacent to the first circuit board and the second circuit board, respectively; or
the adapter includes a standard interface electrically coupled to the power supply device.

18. The UAV of claim 15, wherein:
the at least two functional circuits further includes a third circuit board arranged at the mounting bracket and separate from the first circuit board and the second circuit board; and
the third circuit is electrically coupled to the power supply device.

19. The UAV of claim 18, wherein:
the third circuit board is stacked on an outer surface of a side of the mounting bracket; and
three side edges of the third circuit board are adjacent to the first circuit board, the second circuit board, and the adaptor, respectively.

20. The UAV of claim 19, wherein:
the power supply assembly further includes a controller arranged on a side of the third circuit board away from the mounting bracket;
the controller is electrically coupled to the power supply device; and
both ends of the controller extend relative to corresponding ends of the third circuit board and are electrically coupled to the power supply device.

* * * * *